June 11, 1929.    N. MILLER    1,716,788

MEANS FOR TRANSLATING ROTARY INTO RECIPROCATING MOTION

Filed Jan. 21, 1927

INVENTOR:

Nicholas Miller,

BY

ATTORNEYS.

Patented June 11, 1929.

1,716,788

UNITED STATES PATENT OFFICE.

NICHOLAS MILLER, OF PECKVILLE, PENNSYLVANIA.

MEANS FOR TRANSLATING ROTARY INTO RECIPROCATING MOTION.

Application filed January 21, 1927. Serial No. 162,513.

The invention concerns means for translating the rotary motion of a shaft into reciprocating movement of a screen for sizing materials and the like.

The invention is shown in the accompanying drawings in which

Figure 1:
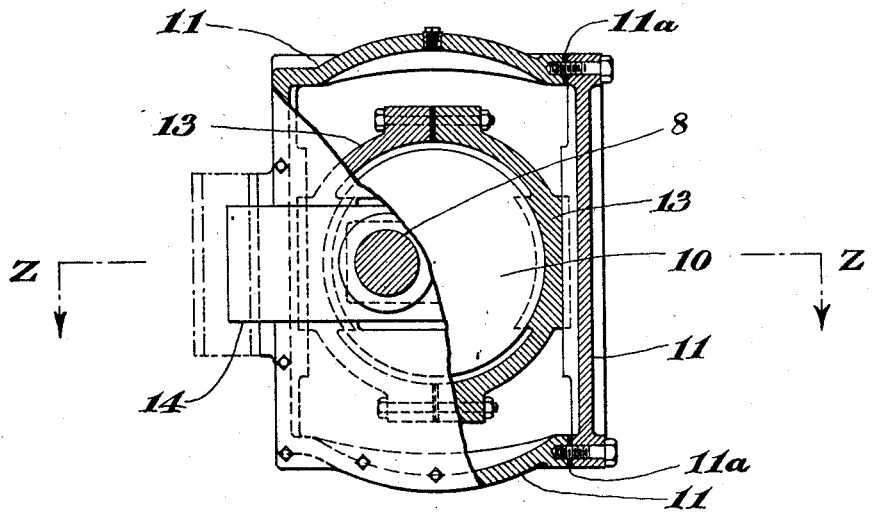
Fig. 1 is a part side elevation and part sectional view of the invention.
Figure 2:
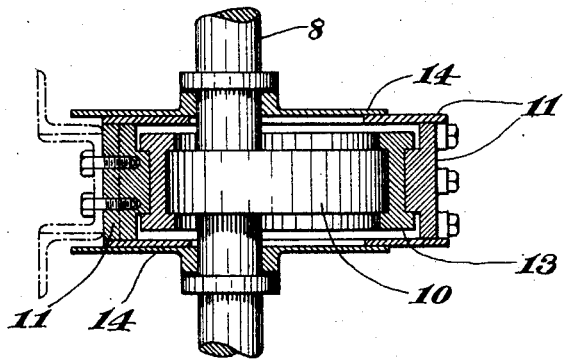
Fig. 2 is a horizontal sectional view on the line Z—Z of Fig. 1.

In these drawings 8 is a rotatable shaft carrying an eccentric 10 which is arranged within a yoke 11, for imparting thereto a reciprocating motion. To this yoke is attached the screen (not shown) for sizing the material, which screen is attached to the angle iron member shown in dotted lines at the left of the yoke, which is attached by bolts as shown. The yoke is formed of members bolted together with shims $11^a$ interposed. The yoke 11 is actuated by the eccentric 10 through a sliding slipper member 13, which latter may contact with the eccentric through 360 degrees or any desired lengths of arcs thereof. The rotary movement of the eccentric is translated into a reciprocating movement of the yoke and screen attached thereto. The yoke 11 is designed to act as a container for lubricant and is provided with seals 14 journalled on the shaft 8 and in relation to which the yoke reciprocates, said seals together with the walls of the yoke excluding dust and retaining lubricant.

The slipper member 13 embraces the eccentric and slips or slides on the yoke. The type of construction shown is intended to typify one method of providing enclosed lubrication for the entire eccentric mechanism.

Having described my invention, I claim:

In reciprocating apparatus for sizing materials, and the like, an actuating device comprising in combination a rotatable driving shaft carrying an eccentric, a slipper in operative relation to said eccentric, parallel guide shoes upon said slipper, a yoke in operative relation to said guide shoes, and seals in relation to which the yoke reciprocates, said seals being mounted on the said shaft and adapted together with the walls of the yoke to exclude dust and retain lubricant.

In testimony whereof, I affix my signature.

NICHOLAS MILLER.